Aug. 25, 1970          J. J. SHEEHAN          3,525,197
SEPARATOR APPARATUS

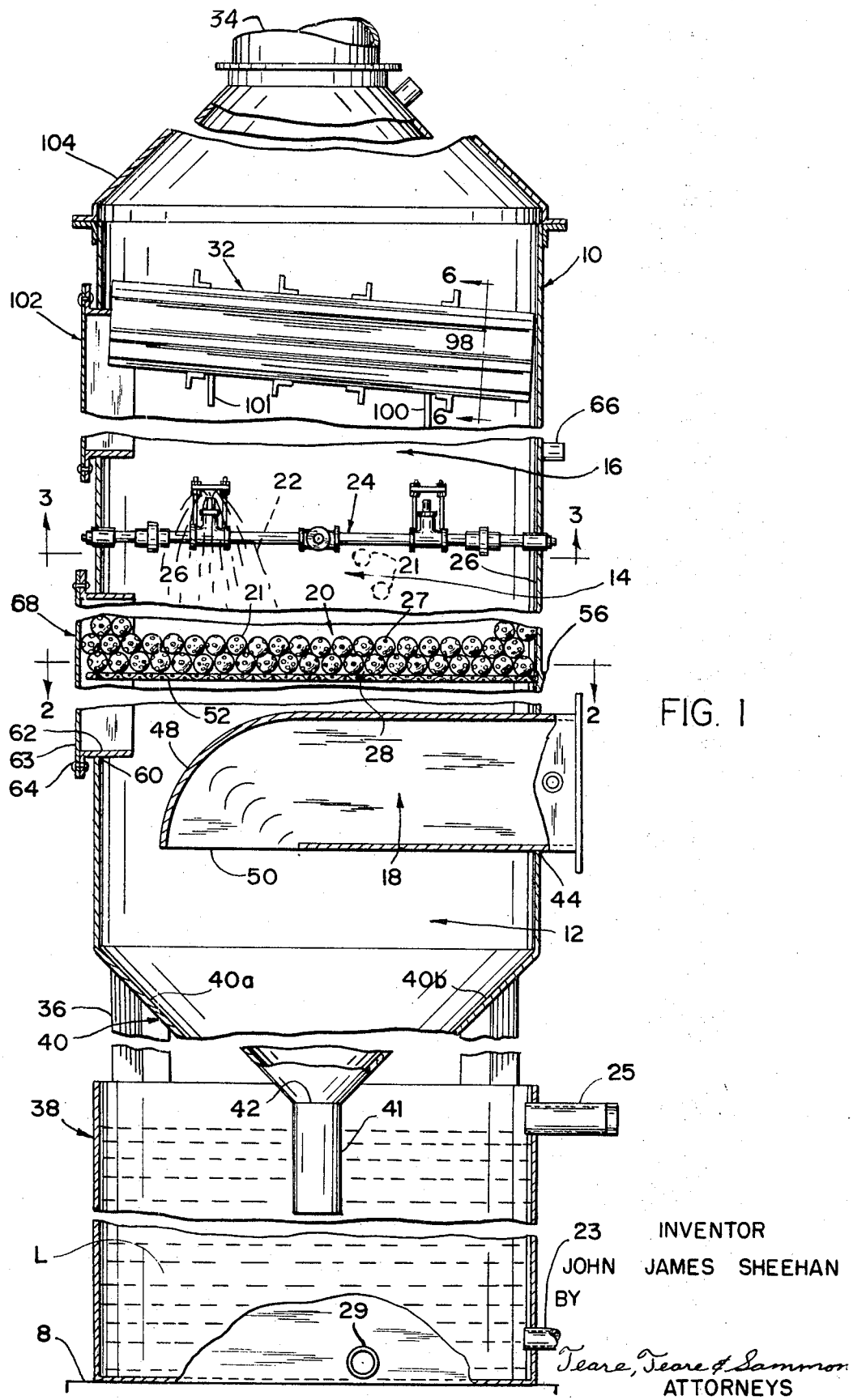

Filed March 13, 1967                    2 Sheets-Sheet 2

INVENTOR
JOHN JAMES SHEEHAN
BY
Teare, Teare & Sammon
ATTORNEYS

United States Patent Office 3,525,197
Patented Aug. 25, 1970

3,525,197
SEPARATOR APPARATUS
John J. Sheehan, Berea, Ohio, assignor to Buell Engineering Company, Inc., Lebanon, Pa., a corporation of Pennsylvania
Filed Mar. 13, 1967, Ser. No. 622,535
Int. Cl. B01d 47/00
U.S. Cl. 55—233
4 Claims

ABSTRACT OF THE DISCLOSURE

An apparatus for the separation of contaminants, such as dust or the like, from a gaseous stream including a filter media comprised of a plurality of relatively hollow buoyant and/or apertured impingement elements upon which is adapted to be impinged and passed upwardly therethrough dust-laden air to be cleaned. A fluid spray system is disposed above the filter media adapted to direct fluid in the form of a spray downwardly onto the impingement elements for washing collected dust therefrom. A separator device is disposed above the fluid spray system for collecting moisture and dust or the like entrained in the moisture, whereby substantially clean air is removed from the top of the apparatus and the moisture and entrained dust or the like therein is returned to the bottom of the apparatus for continuous operation thereof.

BACKGROUND OF THE INVENTION

The present invention relates to dust collecting apparatus, and more particularly relates to an apparatus including a novel construction of a filter and/or fluid cleansing arrangement for removing moisture and contaminants, such as dust or the like, entrained in the moisture from a gaseous air stream.

Heretofore, various types of collector devices have been employed for cleasing dust-laden air. In one such device the air to be cleaned was wetted with a quantity of liquid, passed upwardly through a relatively stationary filter bed, and then passed through a separator device which collected the moisture in the air which remained after the air passed through the filter bed. The wetting in such case was achieved by a specially designed water sump located generally below the filter bed. This sump construction, however, was not only costly to produce and maintain, but was not entirely efficient in removing contaminants from the air to be cleaned.

In such prior devices, the filter bed was of a generally stationary construction comprised of bulky, solid, heavy and generally immovable objects, such as rocks or the like. In such arrangements, however, the relatively immovable objects presented a severe restriction upon the flow of air through the device which greatly reduced the cleansing efficiency thereof. In addition, such arrangements did not provide a sufficient intimate mixing of the gas and liquid and also failed to provide an adequate mixing or contact time of the air to be cleansed with the exposed surfaces of the filter media. Furthermore, the relatively bulky construction of the immovable objects greatly reduced the space capacity of the device within the feasible size limitations of the system. Accordingly, such prior devices did not provide a self-cleansing action on the filter media and often required the use of auxiliary cleaning equipment and frequent cleaning operations thereon.

The separator devices in such prior arrangements were generally of the stationary baffle plate type, but wherein the plates were set in a series of banks above the filter bed so as to receive air from an indirect or horizontal direction rather than directly upwardly from the filter bed. Consequently, such arrangements were not entirely satisfactory in removing the moisture and dust entrained therein from the air to be cleaned. Such arrangements were not only space consuming, but did not provide maximum surface area for exposure to the air flow and resulted in relatively large areas within the device remaining unused for cleansing purposes. In addition, because of the arrangement of the baffle banks there was a limit as to the number of turns which the air flow could make within the space limitations of the device and also as to the speed which the air could flow past the baffle plates, thereby reducing the over-all capacity and operating efficiency of the system.

SUMMARY OF THE INVENTION

In the present invention, the air to be cleaned containing contaminants, such as dust or the like, is deflected upwardly through the apparatus so as to be impinged upon a filter media. The filter media comprises a plurality of relatively buoyant and/or apertured impingement elements constructed and arranged so that the air impinged thereon passes around and/or through the element for collecting dust or the like on the exposed surfaces thereof from the air. A fluid discharge system is disposed above the filter media and directs fluid in the form of a liquid discharge downwardly in counter-flow relation with respect to the upwardly moving air and into intimate mixing coaction with the air and the exposed surfaces of the impingement elements for automatically washing the collected dust or the like therefrom. The air with entrained moisture and any residual dust or the like is then directed upwardly and past the fluid discharge system to a separator device which separates and collects the entrained moisture and dust or the like from the clean air, whereby the clean air is passed out adjacent the top of the apparatus and the collected moisture and dust or the like is returned to the bottom of the device for discharge therefrom.

By this arrangement, a relatively prolonged and turbulent mixing action is achieved between the air to be cleaned and liquid in the region of the filter media. The filter media is comprised of a novel arrangement of impingement elements which are of a hollow, buoyant and/or apertured construction which enables the air to pass around and/or through the elements in an intimate mixing action with the exposed surfaces thereof. This mixing action is achieved by the relatively buoyant characteristic of the elements which enables the same to be rapidly agitated upon impingement of the air flow thereon and/or by reason of the substantially increased exposed surface area presented both interiorly and exteriorly of the individual elements to the air flow. Thus a greater velocity of air flow is provided in the apparatus to achieve a more efficient cleansing action as compared to heretofore known collector devices. In one form, the impingement elements not only contribute to this turbulent mixing action by reason of their apertured construction, but also increase the acceleration of air flow with respect thereto so as to greatly increase the deposit and collection of dust or the like thereon which is not so achieved by the relatively stationary filter arrangements in prior collector devices. In addition, the counter-flow effect of the liquid discharged onto the agitated impingement elements provides a complete and intimate mixing with the exposed surfaces thereof and for a relatively long duration to achieve an efficient self-washing not heretofore provided by prior collector devices. Furthermore, the apparatus incorporates a novel discharge system which directs a liquid into uniform and intimate contact with the impingement elements and which prevents clogging of the outlets thereof after repeated usage.

BRIEF DESCRIPTION OF THE DRAWINGS

FIG. 1 is a side elevation view, partly in section, and partly broken-away, of an apparatus for removing contaminants, such as dust or the like, from a gaseous stream made in accordance with the present invention;

DESCRIPTION OF THE PREFERRED EMBODIMENTS

Figure 3:
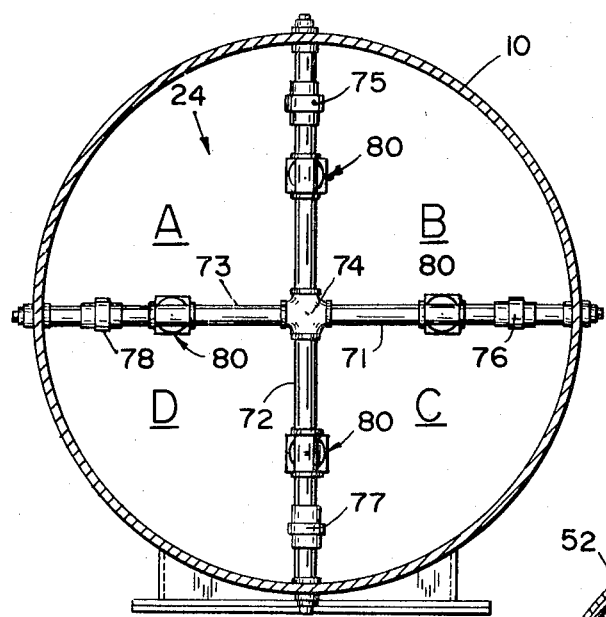
FIG. 3 is a horizontal section view taken along the line 3—3 of FIG. 1.

Generally, and referring to FIG. 1 of the drawings, there is illustrated the novel dust collecting apparatus designated at 2, made in accordance with the invention. As shown, the apparatus includes a housing or casing 10 mounted on a support 8. The casing 10 includes lower 12, intermediate 14, and upper 16 portions which are disposed in superposed, generally vertically oriented relationship. The lower portion 12 includes an inlet duct 18 for delivering air to be cleaned inwardly and generally vertically downwardly into the casing 10. An inverted, generally frusto-conical section 40 depends downwardly from the lower portion 12 and acts to deflect the delivered air to be cleaned angularly upwardly through the casing 10. This air to be cleaned is directed upwardly in the direction of a filter media 20 wherein it passes around and/or through a plurality of impingement elements 21 which are rapidly agitated into a generally suspended condition by the air flow. A fluid discharge system 24 extends transversely of the casing 10 in the intermediate portion 14 and above the filter media 20 so as to direct liquid 22 downwardly in counterflow fashion onto the exposed surfaces of the impingement elements 21. This counter-flow action of the liquid spray 22 acts to effectively wash the collected dust or the like from the exposed surfaces of the impingement elements 21 and moisturizes the air flowing upwardly through the casing 10. The air with entrained moisture and any residual dust or the like is then directed upwardly to a separator device 32 located in the upper portion 16 and extending generally transversely of the casing 10. The separator device 32 acts to separate the moisture and any entrained dust or the like from the clean air. The moisture and dust or the like is collected by the separator device 32 and is directed outwardly and angularly downwardly toward the confronting side wall of the casing 10, whereby it is delivered generally vertically downwardly along the side wall through the casing toward the bottom thereof for discharge therefrom. The resulting clean air is then passed upwardly from the separator device 32 and taken off from the apparatus via an outlet duct 34 adjacent the top thereof.

As shown, the casing 10 is mounted on a drain tank 38 by a plurality of legs 36. The frusto-conical section 40 of the casing 10 extends downwardly into the drain tank 38. The drain tank 38 includes an inlet pipe 23 and an outlet pipe 25 and is adapted to receive discharged material L, in the form of liquid, containing dust or the like, discharged from the casing 10. To this end, the frusto-conical section 40 is provided with an aperture 42 adjacent the apex portion of its bottom which communicates with an outlet pipe 41 which extends into the drain tank 38. The inverted, truncated-section 40 serves several functions, among these being to angularly deflect incoming air to be cleaned upwardly through the apparatus, to provide an impingement separation of the dust or the like entrained with the air, to provide wetted surface area for deposit and removal of dust or the like collected thereon and to provide a ready discharge for relatively heavy dust particles or the like, as by gravity, introduced with the incoming air to be cleaned as will hereinafter be more fully decribed.

More specifically, the casing 10, in the embodiment shown, is preferably of a cylindrical construction which may be made of a metal material. However, the casing 10 may be of other cross-sectional shape, such as polygonal or the like, as described. The interior of the casing 10 may be lined with a corrosion-resistant material (not shown), such as a polymeric or elastomer material which may include plastic or rubber materials. Accordingly, the entire casing may be made of polymeric material such as plastic or the like, as desired.

The inverted, generally frusto-conical section 40 which depends downwardly from the lower portion 12 includes an endless tapered side wall having oppositely disposed surface portions 40a and 40b. The air inlet duct 18 extends through an opening 44 in the casing 10 and may be secured thereto by weldments or the like (not shown) so as to extend inwardly and generally in a horizontal plane transversely of the casing 10. As shown, the duct 18 includes a curved end portion 48 which bends angularly downwardly and generally normal to the longitudinal central axis of the duct. This curved portion 48 is provided with an outlet opening 50. The midpoint of the opening 50 is preferably laterally off-set with respect to the longitudinal central axis of the outlet pipe 41 which extends from the frusto-conical section 40. The maximum transverse dimension of the outlet opening 50 is substantially smaller than the maximum transverse dimension of the casing, but is substantially greater than the maximum transverse dimension of the outlet pipe 41. By this arrangement, incoming air to be cleaned is directed generally horizontally into the casing 10 through the duct 18 and then angularly downwardly in a generally vertical direction through the outlet opening 50. This downwardly directed incoming air is then directly impinged upon the inclined surfaces 40a and 40b so as to be deflected angularly upwardly therefrom with a severe turbulent mixing action. This turbulent mixing action is manifested by the incoming air being propelled primarily against the inclined surface 40a and then against the oppositely disposed surface 40b and then angularly upwardly toward the filter media 20. Moreover, the relatively heavy solids content of the incoming air is initially discharged, as by gravity, directly out through the pipe 41 into the drain tank 38, while the air with any relatively lighter entrained particles, such as dust or the like, is deflected angularly upwardly toward the filter bed 20. Moreover, because the outlet opening 50 in the duct 18 is disposed on the underside thereof any of the moisture or dust descending through the casing 10 will be prevented from entering the duct 18.

Figure 2:
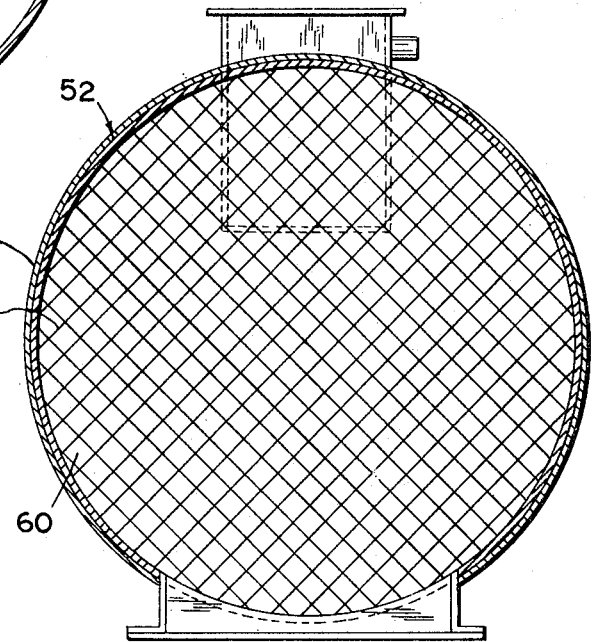
FIG. 2 is a horizontal section view taken along the plane of line 2—2 of FIG. 1 and with the impingement elements removed therefrom for purposes of clarity.

In the form shown, the filter media 20 includes a support member 52 (FIG. 2) for supporting the impingement elements 21 generally transversely of the casing 10. In one form, the support member 52 may be of a generally circular shape, in top plan, defined by a substantially endless outer support ring 54. The support ring 54 may be mounted within the casing 10 by means of an annular recess 56 formed in the casing 10. It is to be understood, however, that any type of arrangement, such as brackets or the like, may be employed for mounting the support member 52 in transverse relation within the casing 10. The support ring 54 preferably provides a support for an open mesh-work construction 58. In the form shown, this mesh-work construction may comprise a plurality of angularly disposed, parallel extending wire elements arranged in a generally criss-cross fashion to provide a plurality of uniform openings 60 therein. For example, when the impingement elements have a maximum transverse dimension of 1⅝ inch the openings 60 are preferably approximately 1 inch square. By this arrangement, the openings 60 are slightly under-size with respect to the impingement elements 21 so as to effectively support the same while affording maximum exposure to the surface thereof by the air flow. It is to be understood, however, that the support member 52 could be comprised of any type of foraminous material in accordance with the principles of the invention.

In accordance with the invention, it is preferred that the impingement elements 21 be made of a relatively chemically inert material and of a light weight, low density, but high surface area construction. In the form shown, the impingement elements 21 are preferably of a spherical construction made of a polymeric material, such as polyethylene or the like. It is to be understood, however, that the impingement elements 21 could be of other non-circular constructions such as polygonal shape so as to maximize the surface area thereof in accordance with the invention. In the form shown, the impingement elements 21 are preferably provided with a plurality of apertures 27 extending from the periphery to the interior thereof. As shown, the impingement elements 21 are preferably disposed in a plurality of superposed layers supported on the support member 52 and extending completely across the transverse dimension of the casing 10. The impingement elements 21 are disposed in contiguous engaged relationship with one another so as to provide interstices or openings 28 therebetween which openings are disposed in generally staggered relationship throughout the depth of the superposed layers of impingement elements 21. Accordingly, there are provided drainage voids not only between the adjacent impingement elements 21 but through the elements themselves via the apertures 27. The impingement elements 21 are sufficiently hollow to provide a relatively thin walled construction to impart the necessary buoyancy thereto relative to the air flow directed upwardly through the casing 10. This not only insures adequate buoyancy in the air flow, but greatly increases the exposed surface area to the air flow for collecting dust or the like both exteriorly and interiorly of the impingement elements. In the case of the apertured impingement element construction, the impingement of air thereon is futrher increased by the increased velocity of the air flow through the constricted apertures 27 in the elements and the voids or interstices 28 between the elements during the rapid agitation of the elements. Accordingly, dust or the like contained with the air is effectively picked-up on the exterior, interior and on the marginal edges presented by the apertures 27 in the elements 21. In the form shown, when the impingement elements 21 have a diameter of approximately 1⅝ inches the number of elements disposed in superposed layers on the support member 52 may range in number from about 2000 to 2,600. For impingement elements with a diameter of approximately 1⅝ inches, it is preferred that the open area of the apertures 27 comprise approximately 15 percent of the outer peripheral area of the sphere. In addition, the outer surface of the elements may be dimpled (not shown), as desired.

As best seen in FIG. 1, a coupling 66 for a manometer (not sohwn) may be provided for controlling the rate of delivery of incoming air to be cleaned via duct 18. For example, in the form shown, a volume of 2200 cubic feet per minute of air of 6 inches of water pressure may be passed through the system. By this arrangement, the impingement elements 21 may be rapidly agitated and held in a suspended condition to achieve optimum turbulent flow of the air to be cleaned.

To provide ready accessibility into the interior of the casing 10 for inserting and removing the impingement elements 21 the casing may be provided with an access door 68. As best seen in FIG. 1, the door 68 includes an annular sleeve 62 extending through an opening 60 in the casing 10. To the sleeve is detachably connected a cover plate 63 by suitable fasteners 64, such as bolts or the like.

Figure 5:
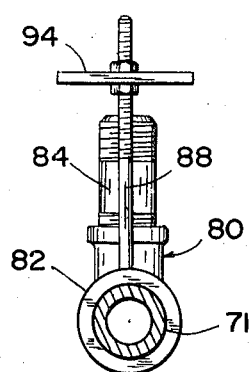
FIG. 5 is an end view looking from the right hand side of FIG. 4 as shown by the line 5—5.
Figure 4:
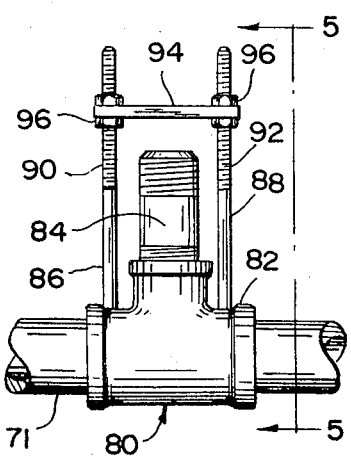
FIG. 4 is an enlarged, fragmentary side elevation view of one of the novel spray means made in accordance with the invention and removed from the system.

As best seen in FIGS. 3 to 5, the fluid discharge system 24 preferably includes four pipes 70 to 73 disposed at right angles to one another and connected at common ends by a four-way coupling 74 so as to divide the transverse area of the casing 10 into four quadrant zones or sections A, B, C and D. The individual pipes 70 and 73 may be provided with suitable couplings 75 to 78 for connecting their respective lengths together to accommodate the transverse dimension of the casing 10. The system includes a novel discharge means 80 associated with each of the respective pipes 70 to 73 which are generally of identical construction and operation so that the following description will proceed with reference to one thereof. As shown, each discharge means 80 includes a generally inverted, T-shaped coupling 82 into the ends of which are threadably connected the respective pipes, such as 71. An elongated, nozzle 84 is threadably connected to and extends generally vertically upwardly from the coupling 82. A pair of oppositely disposed, generally parallel studs 86 and 88 extend vertically upwardly from the coupling 82 on opposite sides of the nozzle 84. The studs 86 and 88 may be connected, such as by weldments or the like, to the coupling 82 and may be threaded adjacent their free ends as at 80 and 92. A generally horizontally disposed deflection plate 94 may be mounted in vertically spaced relation above the free end of the nozzle 84 on the spaced studs 86 and 88. The plate 94 may be mounted on the threaded portions 90 and 92 of the studs 86 and 88 by means of suitable fasteners 96, such as threaded nuts or the like as shown. By this arrangement, the degree and angle of deflection of the liquid emitted from the nozzle 84 may be achieved by simply adjusting the vertically spaced relationship of the deflection plate 94 by actuation of the fasteners 96. Accordingly, the adjustable deflection plate 94 not only provides an effective liquid discharge which is directed angularly downwardly onto the impingement elements 21, but also effectively prevents any foreign materials descending through the casing 10 from entering and clogging the spray nozzle 84. Furthermore, it will be seen that by the novel quadrant disposition of the discharge means 24 that an effective and uniform fluid discharge is directed angularly downwardly onto the impingement elements 21 throughout the full transverse dimension of the casing 10. It is to be understood, however, that other structural arrangements and a number of spray means comprising the fluid spray system may be employed in accordance with the invention.

Figure 6:
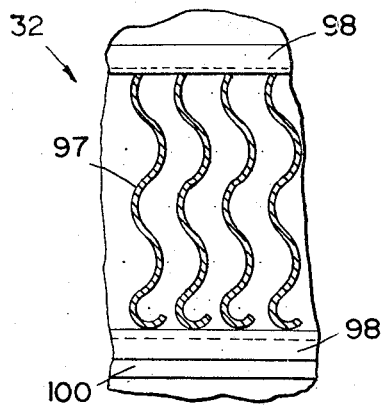
FIG. 6 is an enlarged fragmentary section view showing the novel separator device made in accordance with the present invention.

As best seen in FIGS. 1 and 6, the separator device 32 preferably includes a single bank of generally vertically oriented baffle members 97 connected together in laterally spaced, generally parallel relationship by angles 98. The bank of baffle members may be attached to the casing 10 by suitable brackets 100 and 101. As shown in FIG. 6, the baffle members 97 are each preferably of a corrugated construction so as to provide maximum exposed surface area for receiving air containing moisture and any residual dust or the like entrained therein which passes upwardly therethrough from the filter media 20. The baffle members 97 preferably are of a length sufficient to extend across the full transverse dimension of the casing 10 and are preferably inclined in an angularly downwardly direction between the opposed side walls of the casing 10. By this arrangement, the moisture and any entrained dust or the like remaining in the air to be cleaned passing from the filter media 20 is directed between the baffle members 97. The moisture and dust is separated from the air and collected on the exposed corrugated surfaces of the baffle members 97, whereupon it is automatically directed angularly downwardly onto the confronting interior surface of the casing 10. From the side wall of the casing 10 the moisture and remaining dust is directed downwardly through the casing 10 for ultimate discharge into the drain tank 38 via pipe 41. The clean air separated by the separator device 32 is directed upwardly through a generally frusto-conical top section 104 mounted on th casing for ultimate discharge through the duct 34. A suitable means, such as a fan or the like, not shown, may be operably connected with the outlet conduit 34 to facilitate withdrawal of the clean air from the apparatus, as desired.

The upper portion 16 of the casing may be provided with a suitable door 102 of the type which is generally similar to door 68 to provide ready accessibility into the interior of the casing 10. By this arrangement, the separator device 32 may be quickly removed, as a unit, for purposes of cleaning or the like, as desired.

The water L in the drain tank 38 is preferably maintained at a constant level by introducing water through the inlet pipe 23, such as by a suitable pump (not shown) while the excess water from the system is discharged from the tank via outlet pipe 25. The water from the outlet pipe 25 may be passed through a suitable filter device (not shown) and thence recirculated back into the system, as desired. The relatively heavy particles, such as dust or the like, settle to the bottom of the tank 38 and may be discharged therefrom by a suitable outlet pipe 29.

In a typical operation of the apparatus, incoming air to be cleaned is delivered into the casing 10 via duct 18 from whence it is directed vertically downwardly onto the surface portions 40a and 40b of the frusto-conical section 40. The impingement of the dust or the like contained in the air against the surface portions 40a and 40b creates a severe turbulent action so that the dust-laden air is directed angularly upwardly while the relatively heavy solid dust particles are discharged through pipe 41 into the drain tank 38 from whence they may be ultimately discharged via outlet pipe 29. The dust-laden air is then directed upwardly through the filter media 20 so as to be impinged upon the exposed surfaces of the impingement elements 21. This impingement action produces a severe agitation of the elements 21 so as to impart to the elements a generally suspended condition, as shown in dotted line in FIG. 1. Simultaneously with this agitation of the impingement elements 21, fluid in the form of a liquid 22 is directed downwardly and impinged uniformly onto the now agitating impingement elements 21. The liquid 22 sets up a counter-flow action relative to the upward movement of the air flow which moisturizes the air and simultaneously washes the deposited dust from the exposed surfaces of the impingement elements 21. This combined action of the liquid 22 and upward movement of the air flow creates a severe turbulent action which enhances the rapid agitation of the impingement elements 21 to further remove deposited dust or the like therefrom. The moisturized air moving upwardly from the filter media 20 may contain some residual dust or the like which is passed upwardly between the baffle members 97 of the separator 32. This moisture and entrained dust is then separated from the air and collected on the exposed surfaces of the baffle members 97 which direct the same angularly downwardly toward the interior side wall of the casing 10. This separated moisture and dust is then directed downwardly along the side wall of the casing 10 and along the surfaces, such as 40b, of the frusto-conical section 40 at the bottom of the apparatus. The surfaces of the frusto-conical section 40 thus become wetted from the moisture passing from the separator device 32 or from any liquid which may be discharged from and through the filter media 20. Accordingly, the surfaces, such as 40a and 40b, act to collect additional dust particles which may be introduced through the inlet duct 18. Such materials are then delivered through the pipe 41 into the drain tank 38. The clean air passed from the separator device 32 is then discharged from the top of the apparatus via duct 34, as aforesaid.

By way of specific example, but not of limitation, the separator apparatus of the present invention was operated for efficiency determination and dust (particle) size analysis. The results of such tests are given for purposes of illustration in the tables below as follows:

TABLE I

| | Test Number | | | | | | | |
|---|---|---|---|---|---|---|---|---|
| | 1A | 1B | 3A | 3B | 4A | 4B | 5A | 5B |
| Test location | Inlet | Outlet | Inlet | Outlet | Inlet | Outlet | Inlet | Outlet |
| Gas volume, C.F.M | 866 | 1,033 | 856 | 1,006 | 863 | 1,006 | 2,200 | 2,445 |
| Temperature, °F | 150 | 140 | 140 | 120 | 140 | 120 | 150 | 130 |
| Dust concentration, grains/ft.³ | 7.6 | 0.033 | 18.5 | 0.029 | 8.7 | 0.016 | 6.2 | 0.056 |
| Dust loading, lb./hr | 56.1 | 0.289 | 135.7 | 0.241 | 64.3 | 0.151 | 117.1 | 1.174 |
| Efficiency, percent | | 99.4 | | 99.9 | | 99.8 | | 98.8 |

TABLE II

| | Test Number | | | | | | | |
|---|---|---|---|---|---|---|---|---|
| | 6A | 6B | 7A | 7B | 8A | 8B | 9A | 9B |
| Test location | Inlet | Outlet | Inlet | Outlet | Inlet | Outlet | Inlet | Outlet |
| Gas volume, C.F.M | 1,524 | 1,785 | 1,133 | 1,497 | 1,302 | 1,414 | 1,286 | 1,106 |
| Temperature, °F | 150 | 130 | 150 | 130 | 160 | 130 | 165 | 130 |
| Dust concentration, grains/ft.³ | 8.2 | 0.037 | 10.8 | 0.055 | 13.2 | 0.041 | 7.2 | 0.071 |
| Dust loading, lb./hr | 107.4 | 0.571 | 104.9 | 0.706 | 147.3 | 0.494 | 77.4 | 0.664 |
| Efficiency, percent | | 99.3 | | 99.5 | | 99.5 | | 99.2 |

In Tables I and II, the tests were run on the air to be cleaned entering inlet, as at 18, and on the cleaned air leaving outlet, as at 34. Pressure for the inlet tests was 29.26 inches Hg and for the outlet test 29.92 inches Hg. The pressure drop across the impingement media 20 was between about 0.2 inch to 9.0 inches W.G. and the pressure drop across the separator device 32 was from a trace to about 0.7 inch W.G. for all tests. The rate of the liquid 22, such as water, was approximately about 6 to 7 g.p.m. at about 110° F.

In the tests, an inlet test of about 20 minutes, such as 1A, was first run, then after about a 10 minute interval, a 20 minute outlet test, such as 1B, was run. The inlet tests were performed by measuring the gas with an orifice and then or catching the sample in a stainless steel filter. The outlet tests were performed by measuring the gas with a meter and by catching the sample in a Gelman filter holder.

TABLE III

| Size fraction microns: | Percent of dust in fraction |
|---|---|
| +45 | 3.9 |
| +40—45 | 1.3 |
| +35—40 | 2.2 |
| +30—35 | 2.6 |
| +25—30 | 4.5 |
| +20—25 | 6.2 |
| +15—20 | 9.3 |
| +10—15 | 14.0 |
| +5—10 | 19.5 |
| —5 | 36.5 |
| Total | 100.0 |

Table III represents a composite sample of the particle size from six (6) of the inlet samples, as given in Table I and II above.

From the foregoing examples, it will be seen that separator apparatus of the present invention is extremely efficient in removing contaminants, such as dust particles, entrained in a gaseous fluid stream. For instance, it was found that the apparatus was 99.9% efficient in removing dust having 36.5% of the particles with a size of minus 5 microns.

It is to be understood that while the invention has been described with reference to the illustrated embodiments, it should be noted that the many other modifications and embodiments are contemplated by the present invention by those skilled in the arts that would fall within the scope and principles of the appended claims.

I claim:

1. A dust collecting apparatus for separating contaminants, such as dust or the like, from a gaseous stream comprising,
   an elongated generally cylindrical hollow casing having generally vertically extending side walls,
   said casing including an inlet means adjacent its lower end for receiving contaminated air to be cleaned and an outlet means adjacent its upper end for discharging cleaned air therefrom and defining a passageway communicating said inlet means with said outlet means for transfer of air therethrough,
   a porous foraminous support member disposed transversely completely across said passageway between said inlet and said outlet means,
   a plurality of hollow, buoyant filter elements disposed in layered relation on said support member and occupying the entire transverse dimension of said passageway,
   said filter elements being of a high surface area apertured construction and made from a polymeric material,
   an inverted generally frusto-conically shaped deflection section depending downwardly and in substantially aligned relation with said casing and below said inlet means,
   said deflection section including a generally conical deflection surface disposed in generally axial alignment and angular relation with respect to the central longitudinal axis of said casing,
   said inlet means including an inlet duct member extending horizontally inwardly into said passageway and having an outlet opening in the direction of said deflection section and being laterally offset with respect to the longitudinal central axis of said casing for directing contaminated air downwardly and directly into contact with said deflection surface for removal of relatively heavy solids therefrom and for deflecting the remaining portion of said contaminated air generally toward the opposite side of said deflection surface and then upwardly for impingement directly on said filter elements,
   a liquid discharge system disposed in said passageway immediately above said filter elements for directing a liquid cleaning media downwardly in counter-flow relation with respect to said upward moving contaminated air and into wetting relation directly with said filter elements and said deflection surface so that the contaminants deposited on said filter elements are washed downwardly onto said wetted deflection surface and the remaining portion of said gaseous fluid is directed upwardly toward said outlet means,
   a baffle system disposed in said passageway between said liquid discharge system and said outlet means for collecting moisture and remaining contaminants thereon from said gaseous stream and for directing the same angularly outwardly and downwardly onto said side walls for transmission therealong vertically downwardly onto said wetted deflection surface for ultimate discharge through said outlet means,
   said discharge system including a plurality of discharge means spaced radially outwardly from the longitudinal central axis of said casing and adapted for substantially uniformly impinging a liquid media downwardly generally across the entire surface presented by said filter elements,
   said discharge means being spaced from one another to enable air to pass therebetween,
   each of said discharge means including a support, a generally vertically oriented nozzle mounted on said support adapted for delivering liquid media upwardly therefrom and a deflection plate adjustably mounted in spaced relation from said nozzle on said support and adapted to deflect discharged liquid media outwardly and downwardly toward said filter elements, and
   said passageway being substantially unobstructed between said support member and said baffle system to allow free movement of said filter element in the space between said baffle system and said support member and in the area in and around said discharge means.

2. An apparatus in accordance with claim 1, wherein said casing and said deflection section are disposed in concentric relation with respect to one another so that the outlet opening in said inlet duct member is laterally offset with respect to the longitudinal central axis of said casing and said deflection section to direct the dust laden air into direct contact with the angularly oriented deflection surface.

3. An apparatus in accordance with claim 1, including
   a liquid drain tank disposed below said deflection section, and outwardly of said casing, and
   a discharge outlet in said deflection section for directing discharge material into said drain tank.

4. An apparatus in accordance with claim 1, wherein said baffle system includes a plurality of laterally spaced, generally vertically oriented baffle members, and
   said baffle members being angularly inclined with respect to the longitudinal central axis of said casing being adapted for directing said moisture and contaminants outwardly and angularly downwardly toward the confronting side wall of said casing and for directing clean air separated from said gaseous stream toward said outlet means.

References Cited
UNITED STATES PATENTS

| | | | |
|---|---|---|---|
| 335,923 | 2/1886 | Hennig | 55—422 |
| 696,057 | 3/1902 | Langstrum | 239—524 |
| 1,401,176 | 12/1921 | Miller et al. | 239—524 |
| 2,007,966 | 7/1935 | Fletcher. | |
| 2,335,716 | 11/1943 | Weeden | 239—524 |
| 2,693,946 | 11/1954 | McIlvaine | 55—233 |
| 3,029,030 | 4/1962 | Dey | 239—524 |
| 3,122,594 | 2/1964 | Kielback | 261—94 |
| 3,189,283 | 6/1965 | Moore | 239—524 |
| 3,302,372 | 2/1967 | Hynson et al. | 261—94 |
| 3,364,656 | 1/1968 | Whiton et al. | 261—94 |
| 1,187,208 | 6/1916 | Wahl | 55—244 |
| 2,945,553 | 7/1960 | Brock | 55—248 |

FRANK W. LUTTER, Primary Examiner

B. NOZICK, Assistant Examiner

U.S. Cl. X.R.

55—258 260, 440; 239—524; 261—94